United States Patent
Prasad et al.

(10) Patent No.: US 11,811,718 B2
(45) Date of Patent: Nov. 7, 2023

(54) SYSTEM AND METHOD FOR GENERATING AND RENDERING INTENT-BASED ACTIONABLE CONTENT USING INPUT INTERFACE

(71) Applicant: TALENT UNLIMITED ONLINE SERVICES PRIVATE LIMITED, Delhi (IN)

(72) Inventors: Rahul Prasad, Gurugram (IN); Ankit Prasad, Gurugram (IN)

(73) Assignee: TALENT UNLIMITED ONLINE SERVICES PRIVATE LIMITED, Delhi (IN)

( * ) Notice: Subject to any disclaimer, the term of this patent is extended or adjusted under 35 U.S.C. 154(b) by 0 days.

(21) Appl. No.: 17/405,912

(22) Filed: Aug. 18, 2021

(65) Prior Publication Data

US 2022/0060438 A1    Feb. 24, 2022

(30) Foreign Application Priority Data

Aug. 18, 2020    (IN) ............................. 202011035601

(51) Int. Cl.
| | | |
|---|---|---|
| *H04L 51/42* | (2022.01) | |
| *G06F 40/284* | (2020.01) | |
| *G06F 3/04886* | (2022.01) | |

(52) U.S. Cl.
CPC ............ *H04L 51/42* (2022.05); *G06F 40/284* (2020.01); *G06F 3/04886* (2013.01)

(58) Field of Classification Search
CPC ..... H04L 51/42; G06F 40/284; G06F 3/04886
See application file for complete search history.

(56) References Cited

U.S. PATENT DOCUMENTS

| | | | |
|---|---|---|---|
| 10,089,981 B1* | 10/2018 | Elangovan | G10L 15/22 |
| 2014/0253455 A1* | 9/2014 | Mauro | G06F 3/167 |
| | | | 345/169 |
| 2016/0217124 A1* | 7/2016 | Sarikaya | G06F 40/216 |
| 2018/0121830 A1* | 5/2018 | Schmid | G06Q 50/01 |
| 2018/0315427 A1* | 11/2018 | Kwon | G10L 15/1815 |
| 2018/0357096 A1* | 12/2018 | McConnell | G06F 9/466 |
| 2020/0125919 A1* | 4/2020 | Liu | G06Q 30/0617 |
| 2020/0142719 A1* | 5/2020 | Akbulut | G06F 16/3329 |
| 2020/0380963 A1* | 12/2020 | Chappidi | G10L 15/197 |

* cited by examiner

*Primary Examiner* — Daniel Samwel
(74) *Attorney, Agent, or Firm* — Barry Choobin; PATENT 360 LLC

(57) ABSTRACT

An actionable content generation system (ACGS) and a method for generating and rendering intent-based actionable content in real time are provided. The ACGS, integrated within an input interface, for example, a keyboard, detects and simultaneously analyzes one or more messages being entered by a user in an input field of a user application using the input interface in real time. The ACGS generates tokens from the message(s) and determines intent with a confidence element from the tokens in real time based on a stored mapping and a confidence computation. The ACGS generates actionable content based on the intent using campaign data. The ACGS renders at least one element containing the actionable content on a graphical user interface and/or the input interface for interaction by the user and performance of one or more recommended actions.

18 Claims, 12 Drawing Sheets

FIG. 7

SYSTEM AND METHOD FOR GENERATING AND RENDERING INTENT-BASED ACTIONABLE CONTENT USING INPUT INTERFACE

CROSS-REFERENCE TO RELATED APPLICATIONS

This application claims priority to and the benefit of the provisional patent application titled "SYSTEM AND METHOD FOR GENERATING AND RENDERING INTENT-BASED ACTIONABLE CONTENT VIA AN INPUT INTERFACE", application number 202011035601, filed in the Indian Patent Office on Aug. 18, 2020. The specification of the above referenced patent application is incorporated herein by reference in its entirety.

BACKGROUND

Technical Field

The present invention, in general, is related to electronic communication and message processing. The present invention is particularly related to a system and method for generating intent-prompts with an intent-action perspective, during communication. The present invention is more particularly related to a system and a method for generating and rendering intent-based actionable content on a user device in real time through an input interface, such as a keyboard, during visual and textual communications.

Description of the Related Art

New forms of communication and message processing have emerged through social and digital media platforms. With convenient and widespread use of mobile devices and electronic communications via a network, such as the Internet, the communication between the mobile devices allows an execution of multiple applications. Users typically send electronic messages, such as text messages, chat messages, electronic mail (email), etc., to other users through user applications, like, messaging applications, email applications, etc., that are deployed on mobile devices. There is a need for processing the content and context of these messages, determining the intent of the messages, identifying multiple actions that are performed conveniently by a user based on the intent, and providing direct access for executing these actions, in real time, substantially independent of a user application.

Hence, there is a long-felt need for an integrated actionable content generation system and a method for generating, rendering and invoking intent-based actionable content on a user device, in real time through an input interface, such as a keyboard. Further there is a need for a system and method for the system and method for integrating an actionable content generation system (ACGS) within the input interface invoked on a user device, independent of a user application, such as, a messaging application or chat application The abovementioned shortcomings, disadvantages and problems are addressed herein, which will be understood by reading and studying the following specification.

OBJECTS OF THE EMBODIMENTS HEREIN

A primary object of the present invention is to develop a system and a method for generating, rendering and invoking intent-based actionable content on a user device in real time through an input interface, such as a keyboard, during visual and textual communications Another object of the present invention is to develop a system and a method for integrating an actionable content within the input interface invoked on a user device, independent of a user application, such as, a messaging application or chat application.

Yet another object of the present invention is to develop a system and method to provide users with meaningful and actionable or operational information based on an intent determined from messages entered into an input field provided by a user application.

Yet another object of the present invention is to develop a system and method to determine intent of a message with a confidence element in real time while a user enters the message in an input field of a user application using the input interface.

Yet another object of the present invention is to develop a system and method to employ a rule-based system for determining intent of a message in real time while a user enters the message in an input field of a user application using the input interface.

Yet another object of the present invention is to develop a system and method to determine the intent of a message entered by a first user in real time, independent of the user application used for communication between the first user and one or more second users, and also independent of the second user(s) and messages sent by the second user(s).

Yet another object of the present invention is to develop a system and method to determine the intent of a message in real time based on a context of the message determined using artificial intelligence.

Yet another object of the present invention is to develop a system and method to render intent-based actionable content to the user in the input interface itself.

Yet another object of the present invention is to develop a system and method to render at least one element, such as, prompts, links, dialogs, notifications, etc., containing the intent-based actionable content on a graphical user interface and/or the input interface for interaction by the user and performance of one or more recommended actions contained in the intent-based actionable content.

These and other objects and advantages of the embodiments herein will become readily apparent from the following detailed description taken in conjunction with the accompanying drawings.

The objects disclosed above will be realized and achieved at least by the elements, features, and combinations particularly pointed out in the detailed description of the present invention. The objects disclosed above have outlined, rather broadly, the features of the present invention in order that the detailed description that follows may be better understood. The objects disclosed above are not intended to determine the scope of the claimed subject matter and are not to be construed as limiting of the present invention. Additional objects, features, and advantages of the present invention are disclosed below. The objects disclosed above, which are believed to be characteristic of the present invention, both as to its organization and method of operation, together with further objects, features, and advantages, will be better understood and illustrated by the technical features broadly embodied and described in the following description when considered in connection with the accompanying drawings.

SUMMARY

The following details present a simplified summary of the embodiments herein to provide a basic understanding of the several aspects of the embodiments herein. This summary is not an extensive overview of the embodiments herein. It is not intended to identify key/critical elements of the embodiments herein or to delineate the scope of the embodiments herein, Its sole purpose is to present the concepts of the embodiments herein in a simplified form as a prelude to the more detailed description that is presented later.

The other objects and advantages of the embodiments herein will become readily apparent from the following description taken in conjunction with the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

The present invention addresses the above-recited need for a system and a method for generating, rendering and invoking intent-based actionable content on a user device, in real time during visual and textual communications via an input interface, such as, a keyboard. According to an embodiment of the present invention, the system and method integrates an actionable content generation system (ACGS) within the input interface invoked on a user device, independent of a user application, such as, a messaging or chat application. The ACGS is executable by at least one processor configured to execute computer program instructions for generating and rendering intent-based actionable content via the input interface invoked on the user device, in real time.

According to an embodiment of the present invention, a method is provided for generating, rendering and invoking intent-based actionable content on a user device, in real time during visual and textual communications via an input interface, such as, a keyboard. The method comprises the steps of detecting and simultaneously analyzing one or more messages, that are entered by a user in an input field of a user application using the input interface, with the ACGS. The ACGS generates tokens from the message(s) in real time while the user enters the message(s) in the input field using the input interface. The ACGS determines an intent with a confidence element from the generated tokens in real time based on a mapping stored in a data storage device and a computed confidence level. According to an embodiment of the present invention, the ACGS employs a rule-based system for determining the intent of a message in real time while a user enters the message in the input field of the user application using the input interface. According to an embodiment of the present invention, the ACGS determines the intent based on a context of the message(s) using artificial intelligence.

According to an embodiment of the present invention the ACGS is configured to generate actionable content based on the determined intent using campaign data stored in the data storage device. The campaign data comprises definitions of intent and ongoing campaigns. The ACGS is configured to render at least one element containing the generated actionable content on a graphical user interface and/or the input interface for interacting with the user and performing one or more of a plurality of recommended actions contained in the generated actionable content. According to an embodiment of the present invention, the action element or the intent-based actionable content is selected from a group consisting of one or more of prompts, links, dialogs, notifications, etc. According to an embodiment of the present invention, the ACGS is configured to render the intent-based actionable content to the user in the input interface itself.

According to an embodiment of the present invention, the system and method of the present invention provide users with meaningful and actionable or operational information based on an intent determined from messages entered into an input field provided by a user application. The system and method of the present invention determines the intent of a message entered by a first user in real time, independent of the user application used for communication between the first user and one or more second users, and also independent of the second user(s) and messages sent by the second user(s).

According to an embodiment of the present invention, the related systems comprise circuitry and/or programming for effecting the present invention. According to an embodiment of the present invention, the circuitry and/or programming are any combination of hardware, software, and/or firmware configured to implement the present invention depending upon the design choices of a system designer. Also, in an embodiment, various structural elements are employed depending on the design choices of the system designer.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The foregoing summary, as well as the following detailed description, is better understood when read in conjunction with the appended drawings. For illustrating the present invention, exemplary constructions of the present invention are shown in the drawings. However, the present invention is not limited to the specific methods and components disclosed herein. The description of a method step or a component referenced by a numeral in a drawing is applicable to the description of that method step or component shown by that same numeral in any subsequent drawing herein.

The embodiments herein will be better understood from the following detailed description with reference to the drawings, in which:

FIG. 7 illustrates a code snippet executable by at least one processor of a system for generating actionable content based on the determined intent using campaign data, in a system for generating and rendering intent-based actionable content via an input interface invoked on a user device, in real time, according to an embodiment of the present invention.

Although the specific features of the embodiments herein are shown in some drawings and not in others. This is done for convenience only as each feature may be combined with any or all of the other features in accordance with the embodiments herein.

DETAILED DESCRIPTION

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that other changes may be made without departing from the scope of the embodiments. The following detailed description is therefore not to be taken in a limiting sense.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Figure 1:
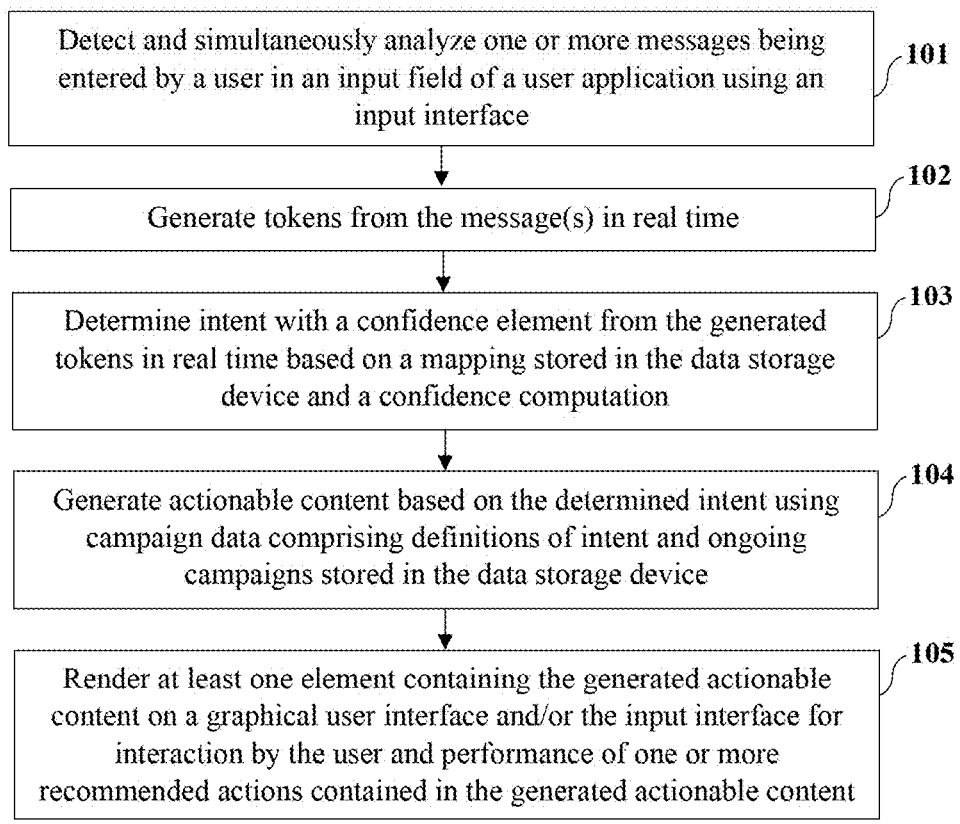
FIG. 1 illustrates a flowchart explaining the process step involved in a method for generating and rendering intent-based actionable content via an input interface invoked on a user device, in real time, according to an embodiment of the present invention.

FIG. 1 illustrates a flowchart of a method for generating and rendering intent-based actionable content via an input interface invoked on a user device, in real time, according to an embodiment of the present invention. As used herein, "input interface" refers to an interface rendered on a user device, for example, a smartphone, for receiving one or more inputs from a user. For example, the input interface is a keyboard or a virtual keyboard that is invoked on the user device when a user clicks on an input field such as a text field provided by a user application such as a messaging application or a chat application. In the method disclosed herein, an actionable content generation system (ACGS) is integrated within the input interface invoked on the user device, independent of a user application, for example, a messaging or messenger application, a chat application, etc. As the input interface such as a virtual keyboard is opened and closed only during an input action into an input field of the user application, the operations and functions of the ACGS is configured to be independent of the user application or any application that is present in the foreground. In an embodiment, the ACGS is installed as an application (app) that is accessible from within the input interface on the user device.

Also, as used herein, the term "intent" refers to an intentional or objective purpose obtained from a message entered by a user into an input field through the input interface. Also, as used herein, "actionable content" refers to content related to an action to be triggered by a predetermined flow for the corresponding intent. For every intent, the ACGS determines an action. For example, if a user types a message "Happy Birthday" into an input field through a virtual keyboard invoked on the user device, the ACGS determines the intent of the message as "wishing" and renders an action such as displaying a prompt to share a birthday sticker with the message.

In the method disclosed herein, as a user enters one or more messages in the input field of the user application using the input interface, for example, for communication with one or more other users, the ACGS, independent of the user application, detects and simultaneously analyzes 101 the message(s) being entered by the user in the input field in real time. The ACGS generates 102 tokens from the message(s) in real time while the user enters the message(s) in the input field using the input interface. The ACGS determines 103 intent with a confidence element from the generated tokens in real time based on a mapping stored in a data storage device and a confidence computation as disclosed in the detailed description of FIGS. 5-6 and FIG. 8. In an embodiment, mappings of tokens with intent definitions are stored in a JavaScript Object Notation (JSON) file format in the data storage device, for example, a server. For each intent, the definition file, that is, the JSON file contains a set of regular expressions for intent detection and intent attribute extraction. The definition file also contains a list of operating system (OS) application package names, for example, Android application package names, configured to increase or boost a confidence level of the determined intent. The ACGS determines the confidence level based on multiple factors. Each factor increases the confidence level by one level. In an embodiment, the ACGS employs a rule-based system for determining intent of a message in real time while a user enters the message in the input field of the user application using the input interface. In an embodiment, the ACGS determines intent based on mappings of tokens and intents using regular expressions (regex) that are stored in the data storage device, for example, a server, and fetched during ACGS application launch. In another embodiment, the ACGS determines the intent using artificial intelligence. In another embodiment, the ACGS determines the intent based on a context of the message(s) using artificial intelligence.

Figure 6:
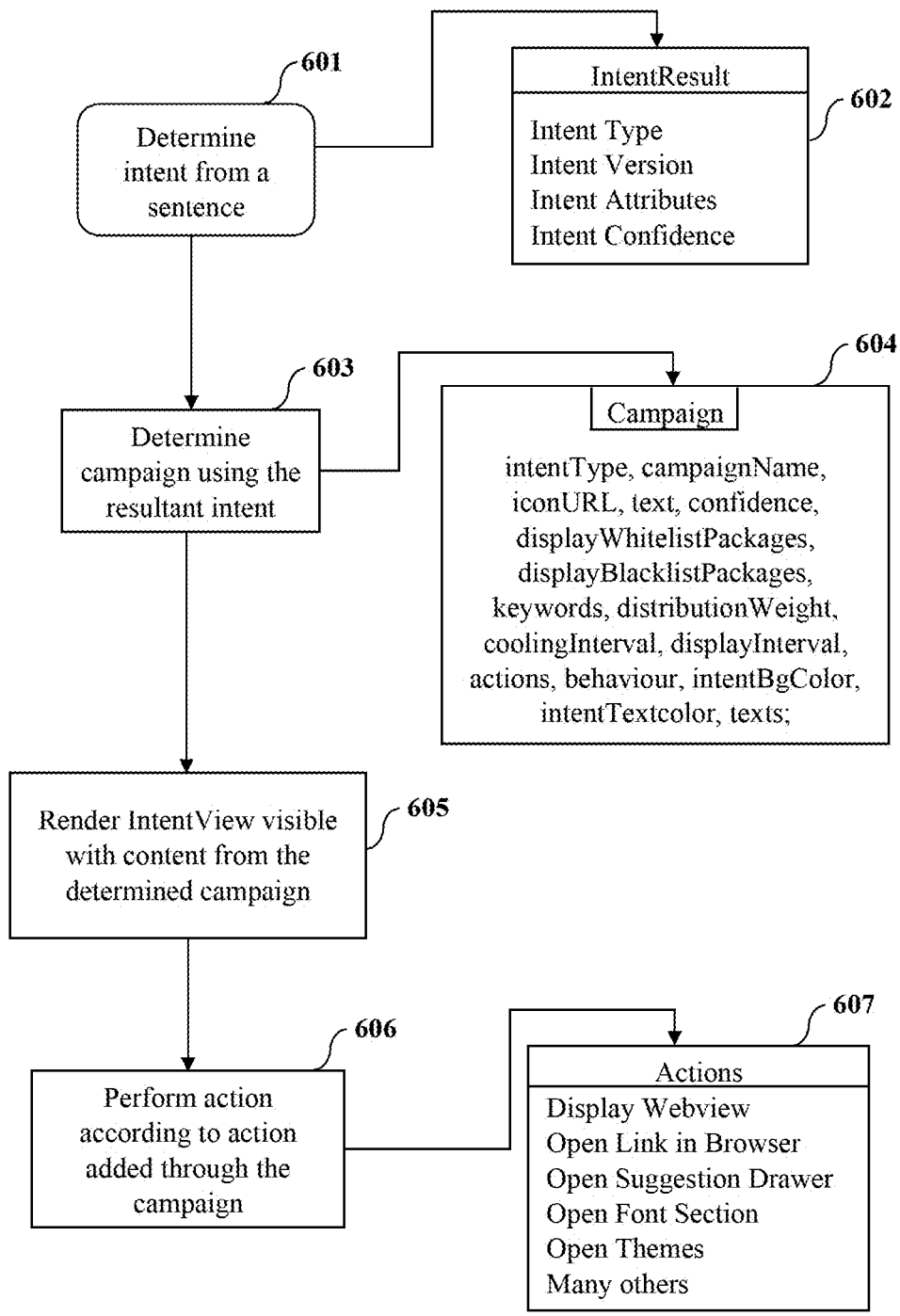
FIG. 6 illustrates a flowchart for a method of generating intent-based actionable content using campaign data for interaction by a user, according to an embodiment of the present invention.
Figure 9:
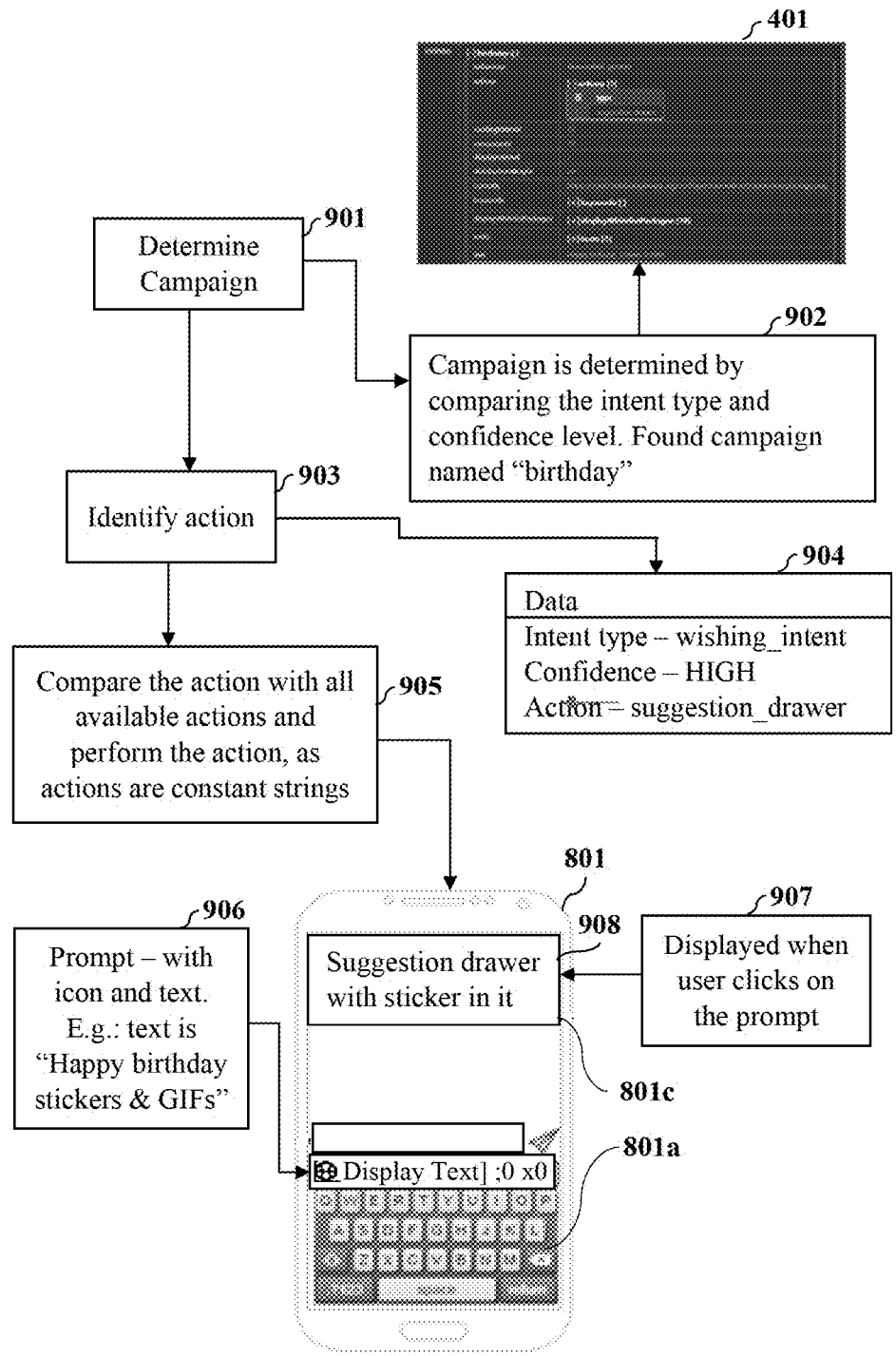
FIG. 9 illustrates a flowchart explaining a method for generating actionable content based on the intent determined as shown in FIG. 8 using campaign data, according to an embodiment of the present invention.

The ACGS generates 104 actionable content based on the determined intent using campaign data stored in the data storage device as disclosed in the detailed description of FIGS. 6-7 and FIG. 9. The campaign data comprises, for example, definitions of intent and ongoing campaigns. In an embodiment, the campaign data is stored in a JSON format. Each campaign in the campaign data is a JSON object that contains attributes to control how the campaign is rendered or displayed to the user, what action should be taken in response to a user's click action, the set of applications (apps) in which the campaign should be displayed, the set of intent type and intent attributes for which a campaign should be displayed, a demographic target comprising age, gender, location, etc., of the campaign, etc. The ACGS renders 105 at least one element containing the generated actionable content on at least one of a graphical user interface and the input interface for interaction by the user and performance of one or more of multiple recommended actions contained in the generated actionable content. The element is, for example, one or more of prompts, links, dialogs, notifications, etc., containing the intent-based actionable content. For example, during a chat conversation between a first user and a second user through a user application, if the first user enters a message about food items or dishes that he or she would like to eat, then the ACGS generates and renders an element such as a prompt containing actionable content such as a uniform resource locator (URL) that directly redirects the first user to a food delivery website. In an embodiment, the ACGS renders the intent-based actionable content to the user in the input interface itself.

In the method disclosed herein, the ACGS renders intent prompts from an intent to action perspective. The ACGS provides users with meaningful and actionable or operational information based on an intent determined from messages entered into an input field provided by the user application. In an embodiment, the ACGS determines the intent of a message entered by a first user in real time, independent of the user application used for communication between the first user and one or more second users, and also independent of the second user(s) and messages sent by the second user(s).

Figure 2:
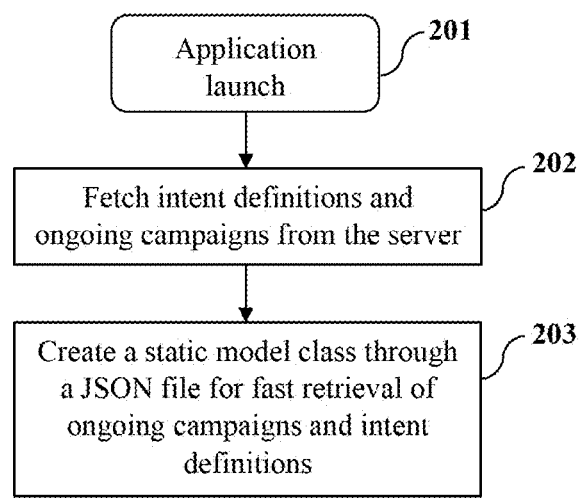
FIG. 2 illustrates a flowchart for a method of storing campaign data used for generating intent-based actionable content, on a data storage device, in a system for generating and rendering intent-based actionable content via an input interface invoked on a user device, in real time, according to an embodiment of the present invention.
Figure 3:
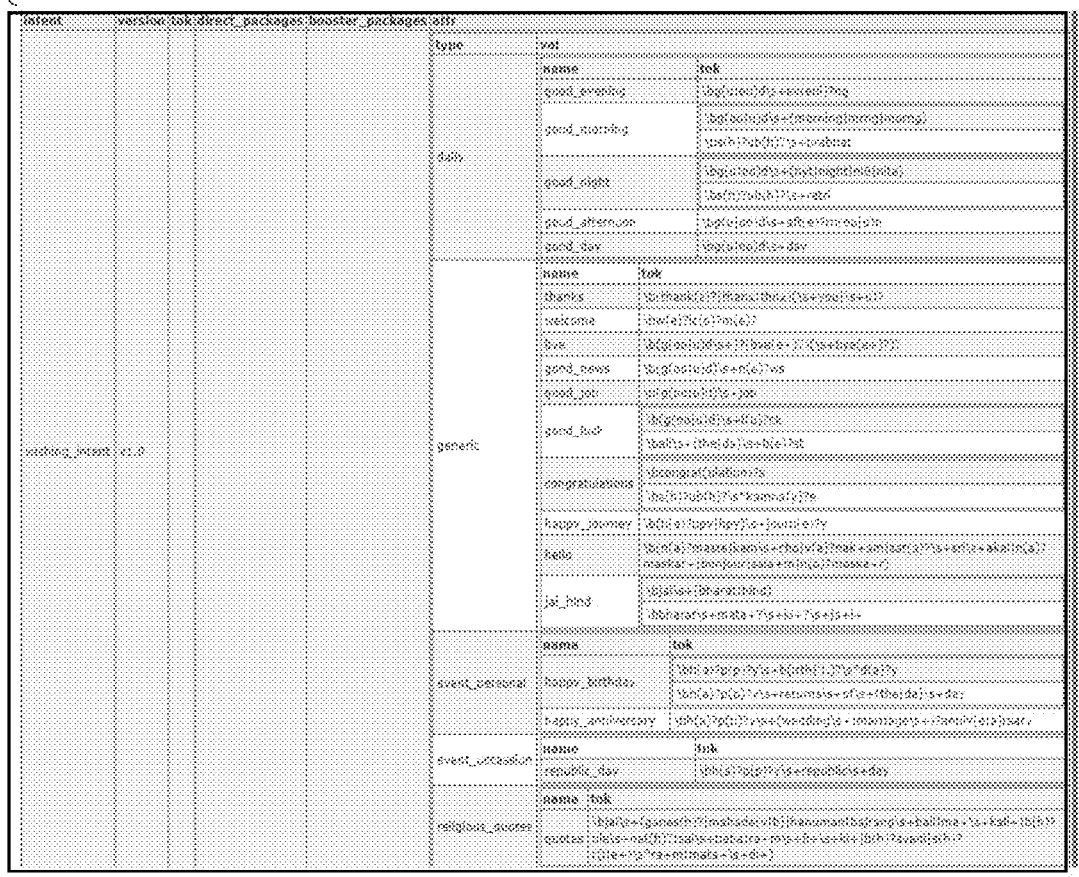
FIG. 3 illustrates a database schema comprising a mapping of definitions of intent and tokens stored in a tabular format, in a system for generating and rendering intent-based actionable content via an input interface invoked on a user device, in real time, according to an embodiment of the present invention.
Figure 4:
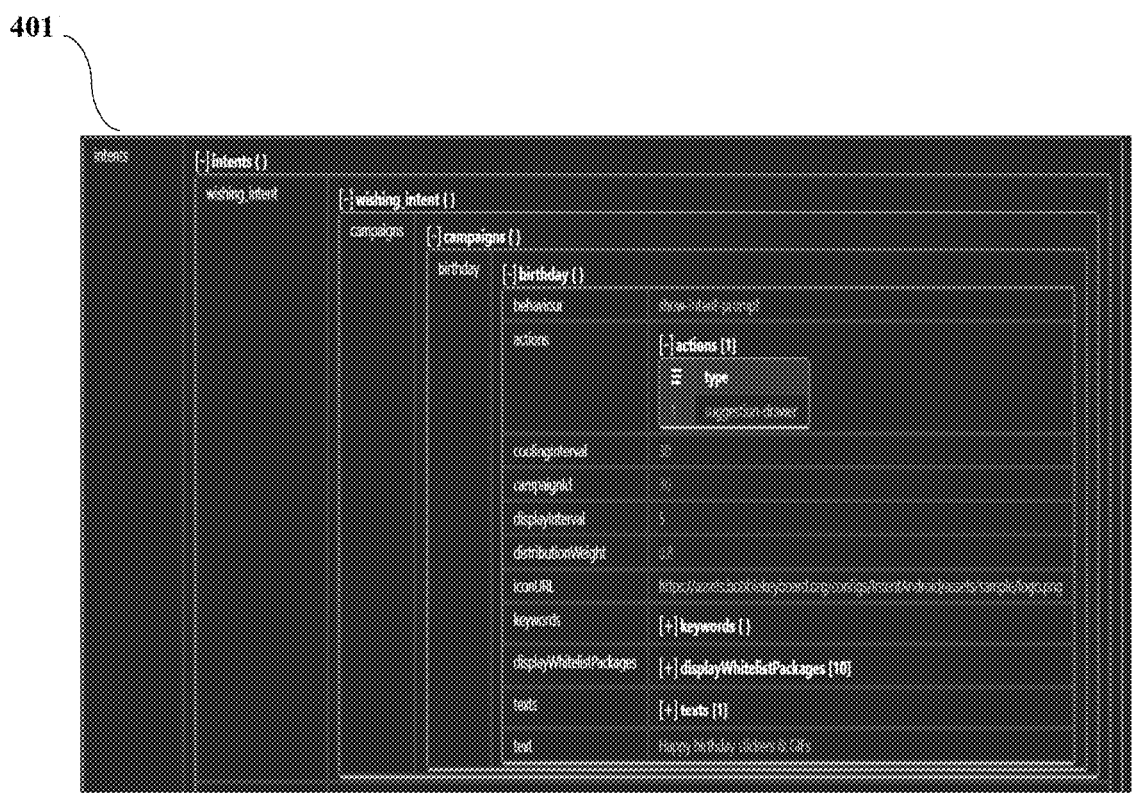
FIG. 4 illustrates a database schema comprising campaign data containing definitions of intent and ongoing campaigns stored in a tabular format, for generating and rendering intent-based actionable content via an input interface invoked on a user device, in real time, according to an embodiment of the present invention.

FIG. 2 illustrates a flowchart of a method for storing campaign data used for generating intent-based actionable content, on a data storage device, according to an embodiment of the present invention. In an embodiment, the campaign data comprising, for example, intent definitions and ongoing campaigns as illustrated in FIGS. 3-4, are stored on a data storage device, for example, a server. In an embodiment, the server that stores the campaign data is remotely accessible by the actionable content generation system (ACGS) via a network, for example, the internet. When a user deploys or launches 201 the ACGS app in the input interface, for example, a keyboard, invoked on the user device, the ACGS allows the user to create a profile associated with the ACGS. During creation of the profile, the ACGS fetches or retrieves 202 the campaign data by sending application programming interface (API) requests to the server. The server transmits the campaign data, for example, in the form of intent definitions and intent settings or campaigns to the ACGS via the network. In an embodiment, the server transmits the campaign data as a file, for example, a JavaScript Object Notation (JSON) file. The JSON file stores the campaign data as data structures and objects in a standard data interchange format, for example, the JSON format, as illustrated in FIGS. 3-4. The ACGS receives the JSON file containing the campaign data as an API response from the server to the API request sent by the ACGS. The ACGS stores the campaign data in a data storage device, for example, a local data store or a database in the user device. In an embodiment, the ACGS creates 203 a static model class through the JSON file for fast retrieval of the campaign data from the server. In an embodiment, the ACGS creates a static model class for storing token mappings, intent definitions, and a list of campaigns from one or more data access objects. Through the static model class, the campaign data can be accessed from any other class without creating new instances. The ACGS executes the static model class on a separate thread for unrestricted operation of the keyboard, ease of comparison, and quick determination of intent of each sentence of a message entered into the input field by the user.

FIG. 3 exemplarily illustrates a database schema 301 comprising a mapping of definitions of intent and tokens stored in a tabular format, according to an embodiment of the present invention. The database schema 301 aids in determining intent from a sentence in a message. In an embodiment, the actionable content generation system (ACGS) employs a rule-based system for determining the intent of a message in real time while a user enters the message in an input field of a user application using an input interface invoked on a user device. The rule-based system is a system of regular expressions (regex) used for comparison and determination of an intent type and an intent name Each token represented as "tok" along with a "name" under "val" illustrated in FIG. 3, is a regex. Each regex along with name and type is stored in the data storage device, for example, a database. In an embodiment, the database schema 301 comprises a mapping of intents to applications identified, for example, as direct applications or direct packages, and booster applications or booster packages as illustrated in FIG. 3. For example, the database schema 301 comprises a mapping of a food intent to a direct application such as a food ordering and delivery application. In another example, the database schema 301 comprises a mapping of a buying intent to a booster application such as a browser application. Therefore, if a user enters a sentence in an input field provided by a food ordering and delivery application, the ACGS determines a food intent, and if a user enters a sentence in an input field provided by a browser application, the ACGS determines a buying intent. After receiving the complete sentence entered by a user in the input field of the user application, the ACGS matches the sentence with the regex and identifies a match, through which the ACGS determines a corresponding name and type of the intent. These regex tokens are also referred to as "rules" for a sentence to determine the correct intent type.

In an example as illustrated in FIG. 3, the database schema 301 displays a token mapped to every event subtype, for example, happy_birthday and happy_anniversary. Each token operates as a regular expression (regex) used to determine intent from a sentence in a message. When a user types a sentence in an input field of the user application, the ACGS tokenizes the sentence and compares the tokens of the sentence to the regex tokens to determine an event related to that sentence with a confidence level, for example, low_confidence or high_confidence. The ACGS computes a confidence level for each of the words used in the sentence. For example, the ACGS computes a high confidence level for "Happy Birthday" and a low confidence level for "Birthday to you".

FIG. 4 exemplarily illustrates a database schema 401 comprising campaign data containing definitions of intent and ongoing campaigns stored in a tabular format, according to an embodiment of the present invention. The database schema 401 comprises the campaign data stored as a JSON file on the server and transmitted to the ACGS deployed in the input interface of the user device as an API response to an API request from the ACGS. As illustrated in FIG. 4, the campaign data comprises the intent definitions and ongoing campaigns containing actions to be performed for corresponding intents. For example, for a wishing intent determined from a birthday message entered in an input field by a user, the campaign data comprises a birthday campaign mapped to birthday stickers and files of a graphics interchange format (GIF) that are accessible by an intent prompt as illustrated in FIG. 4. The ACGS generates actionable content, for example, the birthday stickers and GIF files, on which an action can be performed by the user. The ACGS renders an element, for example, the intent prompt, which when clicked by a user provides birthday stickers and GIF files to the user for sending to another user via a user application.

Figure 5:
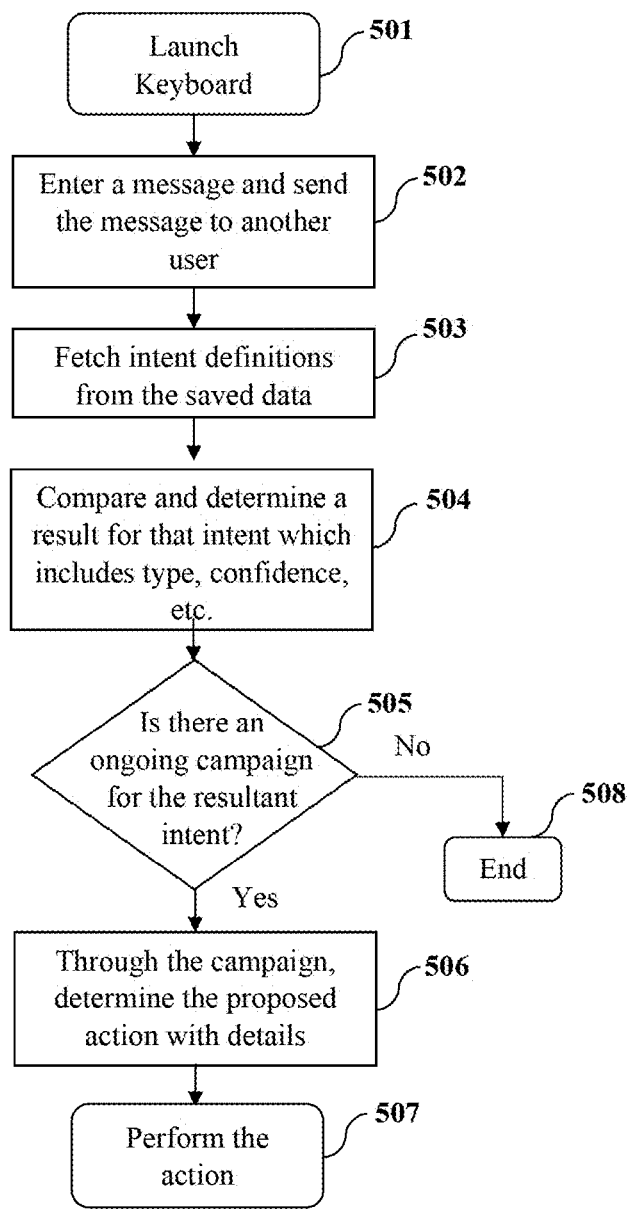
FIG. 5 illustrates a flowchart for a method of determining intent of a message(s) and generating and rendering intent-based actionable content via an input interface invoked on a user device, in real time, according to an embodiment of the present invention.

FIG. 5 illustrates a flowchart of a method for determining intent of a message(s) and generating and rendering intent-based actionable content via an input interface, for example, a keyboard, invoked on a user device, in real time, according to an embodiment of the present invention. When the user performs an input action, for example, a click action, in an input field, for example, a text field, provided by a user application, the input field is focused and the keyboard is opened or launched 501. Consider an example where the user launches the keyboard by clicking on the input field of a messaging application and proceeds to enter 502 a message in the input field for sending the message to other users on any messaging application. After entering the message in the input field, the user clicks a send button from the messaging application or from the keyboard itself. In an embodiment, on receiving the click action on the send button, the actionable content generation system (ACGS) determines the intent of the message based on a mapping of tokens and intent definitions stored in the data storage device and a confidence computation. To determine the intent, the ACGS fetches 503 intent definitions from the static model class and compares 504 tokens generated from the textual data in the sentence(s) of the message with all the tokens that are stored in the static model class to generate a result comprising attributes, for example, type of intent and a confidence level of the intent.

In one embodiment, each intent is comprised of several intent tokens associated with it as well as a list of attribute tokens. For example, shopping_intent would have 'buy' as an intent token and 'mobile', 'fridge', etc. as attributes tokens. In one embodiment, the intent lists direct application and booster applications associated with it. For example, shopping_intent can categorize Amazon, Flipkart, etc. as direct applications as the probability of the user using mentioned applications is higher with intent of shopping. Similarly, Google Chrome, Universal Control (UC) Browser, etc can be categorized as booster applications as the mentioned applications to a certain extent that the user has an intent of shopping. In one embodiment, as the input message is tokenized into separate words, for each word, it is matched with either intent token or attribute token. If word matches the intent token, it's categorized as intent contributor and if it matches any of the attribute tokens, it is categorized as confidence contributor In one embodiment, the ACGS computes the confidence level of the intent as follows. Every sentence in the message has multiple matching intents defined in the static model class. To determine the best match of the sentence with an intent, the ACGS implements a predefined number of confidence levels. For example, the ACGS implements four confidence levels for intent such as No_Confidence, Low_Confidence, Medium_Confidence, and High_Confidence. The ACGS sets the default confidence level to No_Confidence for any intent. If the intent token from the static model class matches with the text token of the message, the ACGS sets the confidence level of the intent associated with the message to Low_Confidence. The ACGS then determines whether the intent match has any attribute that is a confidence contributor. The attribute is a regular expression (regex) listed as a named token under an attribute (attr) column as illustrated in FIG. 3. If the intent token matches with the text token and has at least one attribute that is a confidence contributor, the ACGS sets the confidence level of the corresponding intent to High_Confidence. If the intent token matches with the text token and has at least one attribute, but none of the attributes are confidence contributors, the ACGS sets the confidence level of the corresponding intent to Medium_Confidence. If the intent token does not match with the text token, but the intent token has at least one attribute as a confidence contributor and has more than one matching attribute, the ACGS sets the confidence level of the corresponding intent to Low_Confidence. Consider the below examples for each of the used cases, Case 1:
text=want to buy nike shoes, package=com.whatsapp
Output:
Confidence: "low_confidence",
Lifetime: NA,
Attributes: NA.
Intent: "shopping_intent",
In the current case, the confidence is low since it only matches the intent and not the attributes and there is not match with booster package and direct package.

Case 2:
text=want to buy nike shoes, package=app.bayie.com.bayie
Output:
Confidence: "high_confidence",
Lifetime: "Real-Time",
Attributes: NA
Intent: "shopping_intent",
In case 2, the package name is under direct package therefore the confidence is high.

Case 3:
text=" ", package=app.bayie.com.bayie
Output:
Confidence: "high_confidence",
Lifetime: "Real-Time",
Attributes: NA
Intent: "shopping_intent"
In case 3, even though the text does not match with any intent or attribute, the confidence is high since the package is direct package.

Case 4:
text=want to buy hike shoes
package=org.zbrowser.ui.activities
Output:
Confidence: "medium_confidence",
lifetime: NA
Attributes: NA
Intent: "shopping_intent"
Continuing from the case 1, wherein the confidence is low, as the package is a booster package it will increase the confidence by 1 level.
Case 5:
text=want to buy adidas shoes, package=com.whatsapp
Output:
Confidence: "high_confidence",
Lifetime: NA,
Attributes: brand: ["adidas"],
Intent: "shopping_intent",
In case 5, the buy matches the intent and adidas that matches the attribute but the package does not come under booster application or direct application. So, the confidence is marked medium confidence.
Case 6:
text=want to buy fashion freak shoes, package=com.whatsapp
Output:
Confidence: "medium_confidence",
Lifetime: NA,
Attributes": brand: ["fashion freak"],
Intent": "shopping_intent",
In case 6, the buy matches the intent and fashion freak which matches the attribute but the package does not come under booster application or direct application. So, the confidence is marked medium confidence.
Case 7:
text=want to fashion freak shoes package=com.whatsapp
Output: None.
In case 7, the intent does not match so if the intent does not match and the package is not a booster application, then confidence will be no confidence and in no confidence.

In an embodiment, the ACGS increases the confidence level by one level if a current application comes in a booster application. The ACGS determines whether a sentence is entered in a direct application or a booster application and determines the intent and the confidence level accordingly. For example, if a user enters a sentence in an input field provided by a food ordering and delivery application that operates as a direct application in a direct package, the ACGS determines a food intent. In another example, if a user enters a sentence in an input field provided by a browser application that operates as a booster application in a booster package as opposed to an email application, the ACGS determines a buying intent. When a user intends to buy a product, the user typically enters the name of the product in a browser application instead of another application such as an email application. In an example, if a user enters XYZ television or XYZ TV in a browser application as opposed to an email application, the ACGS determines a buying intent.

After determining the intent of the message, the ACGS determines 505 whether an ongoing campaign is associated or mapped with the intent. If there is no campaign mapped to the intent, the process ends 508. If a campaign is mapped with the intent, the ACGS generates actionable content based on the determined intent using the campaign data previously stored in another model class as illustrated in FIG. 4. The campaign data comprises campaigns containing information regarding actions, for example, actionType such as prompt, an action to be executed for an action type, text within the prompt, an icon for the prompt, a link to a website, if any, etc. For example, if the action type is "prompt", the campaign data comprises the action to be executed when the prompt is clicked by a user. For example, for a message such as "happy birthday", the campaign data comprises the action type as "prompt" and the action as "render a view with birthday stickers therewithin".

In one embodiment, each campaign includes the following attributes that includes, but not limited to, intent type which explains intents for which this campaign needs to be run, an action that needs to be performed for that campaign. For examples, the actions include showing webview, redirect to a url, show suggestion drawer, etc. The campaign further includes a cooling interval that provides a time difference between campaigns when the campaigns are shown consecutively, a confidence level which decides when matched intents for that campaign have confidence only above this threshold, a display interval that provides a time interval for which the campaign should be shown at one point of time, a distribution weight which decides weightage of the campaign. In case there are multiple campaigns matching to a text, the weight decides the campaign that needs to be displayed. Further, the campaign includes an icon representation of the campaign which needs to be displayed on the user interface, a text representation of the campaign which needs to be shown to the user, and a list of package names where the campaign needs to be displayed.

The ACGS, therefore, determines 506 one or more recommended actions with details using the campaign data. The ACGS renders an element, for example, a prompt, containing the generated actionable content in the keyboard for interaction by the user and performance 507 of the recommended action(s). In the above example, when the user clicks the prompt, the ACGS renders the view with stickers for birthday celebrations that the user may select for sending to another user. In another example, if the ACGS determines a food related intent and determines campaigns for food delivery websites based on the intent, the ACGS renders a prompt that redirects the user to the food delivery website or app.

FIG. 6 illustrates a flowchart of a method for generating intent-based actionable content using campaign data for interaction by a user, according to an embodiment of the present invention. Consider an example where a user enters a message by typing a sentence into an input field of a user application such as a messaging application using an input interface, for example, a keyboard, invoked on a user device. The actionable content generation system (ACGS) integrated in the input interface determines 601 an intent with a confidence element from the sentence by tokenizing the string and comparing the tokens of the string with all the tokens available in the preconfigured static model class disclosed in the detailed description of FIG. 2. The resultant intent 602 determined by the ACGS comprises, for example, an intent type, an intent version, intent attributes, and intent confidence as illustrated in FIG. 6. For example, the resultant intent 602 contains one of the following results as its content.
intentType=wishing_intent
version=v1.0
confidence=HIGH
attributes=any of the (type, val) pair The ACGS then generates actionable content based on the resultant intent 602 as follows. The ACGS determines 603 a campaign 604 from campaign data using the resultant intent 602. The ACGS pre-fetches the campaign data from the server and stores the campaign data in a local data store or a database. The campaign data comprises attributes, for example, intent type, campaign name, icon, background, text, confidence, action, URL, etc. The campaign data comprises a constant string name, for example, actions, that represents actions that may be performed. In an embodiment, to determine the campaign 604, the ACGS retrieves a list of campaigns with the provided intentType from the database, for example, using a data access object (DAO). The ACGS filters the campaigns from the retrieved list of campaigns and retains active or operating campaigns. The active or operating campaigns are campaigns with an unexpired lifetime as defined, for example, in a coolingInterval attribute in the campaign 604 as illustrated in FIG. 6. The ACGS selects the campaign 604 having the highest cumulative weight among the list of campaigns. The ACGS renders 605 a view element, herein exemplarily referred to as "IntentView", visible on the user device. The IntentView is a view element in the user device, for example, a strip in a row that displays emojis, an alert box, a dialog box, etc. The IntentView contains actionable content from the selected campaign 604. Attributes, for example, icon, background, text, action, URL, etc., of the selected campaign 604 are used to inflate the IntentView. When the IntentView detects a click event thereon, the ACGS executes one or more actions 606 defined in the selected campaign 604. After identifying one or more actions defined for the selected campaign 604, the ACGS compares the action with available actions 607 and facilitates performance of the action. The available actions 607 comprise, for example, displaying a web view, opening a link in a browser, opening a suggestion drawer, opening a font section, opening themes, etc. In an example, the ACGS, on detecting a click event on the IntentView, redirects the user to a fonts section of the keyboard or notifies the user using notifications.

FIG. 7 exemplarily illustrates a code snippet executable by at least one processor of a system for generating actionable content based on the determined intent using campaign data, according to an embodiment of the present invention. During the generation of actionable content, the actionable content generation system (ACGS) determines a campaign for an intent using campaign data. The ACGS queries the database and fetches all the campaigns that have an intentType equal to the intentType of the target intent. In an embodiment, at least one processor of the system executes computer program instructions defined in the following exemplary code snippet for fetching the campaigns.
List<Campaign>
campaignList=campaignDao.queryBuilder( )
.where(CampaignDao.Properties.IntentType.eq(intent-Type))
.whereOr(CampaignDao.Properties.Confidence.isNull( ), CampaignDao.Properties.Confidence.like("%"+intentConfidence+"%")).list( );

In the above code snippet, intentType and intentConfidence are obtained from "currentIntent", that is, the intent determined by the ACGS from the sentence or message typed by a user in the input field of the user application. The ACGS filters the campaigns and selects the campaign with the most distributed weight as disclosed in the detailed description of FIG. 6. Using the processor, the ACGS executes the code snippet exemplarily illustrated in FIG. 7 for selecting the campaign with the most distributed weight.

Figure 8:
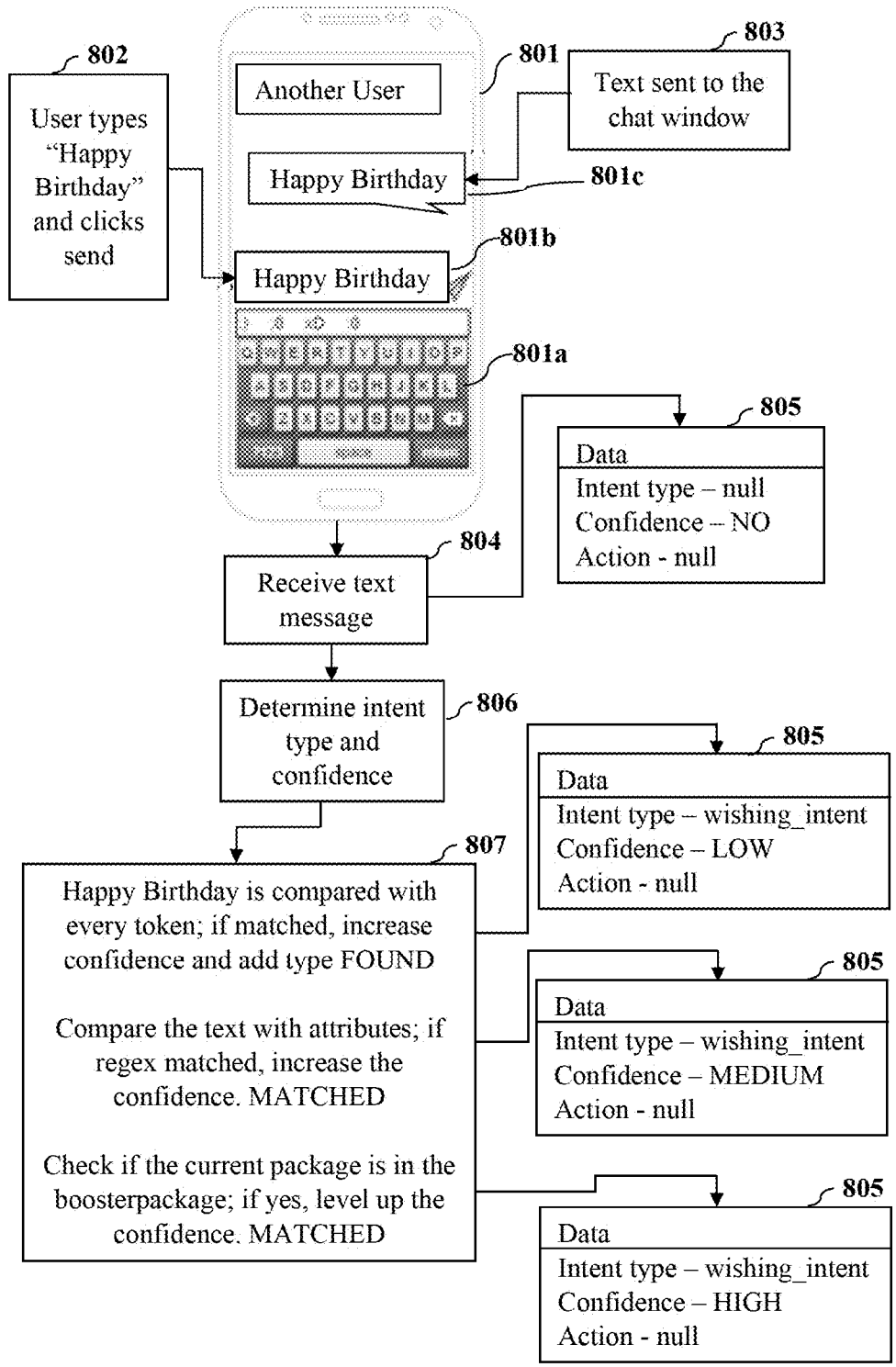
FIG. 8 illustrates a flowchart for a method for determining intent of a message with a confidence element from tokens generated from the message, in real time, in a system for generating and rendering intent-based actionable content via an input interface invoked on a user device, in real time, according to an embodiment of the present invention.

FIG. 8 illustrates a flowchart of a method for determining intent of a message with a confidence element from tokens generated from the message, in real time, according to an embodiment of the present invention. Consider an example where a user types 802 a text message "Happy Birthday" in an input field 801b of a user application such as a chat application deployed on a user device 801 and clicks a send button provided by the user application as illustrated in FIG. 8. The user application sends 803 the text message "Happy Birthday" to a chat window displayed on a graphical user interface (GUI) 801c of the user application. While the user types the text message in the input field 801b, the actionable content generation system (ACGS) receives 804 the text message and data 805 of the text message. The ACGS determines 806 intent with a confidence element of the text message using the following exemplary process 807 also disclosed in the detailed description of FIG. 5. The ACGS tokenizes and compares the text string "Happy Birthday" with tokens stored in the database. If the token(s) of the text string match with an intent token stored in the database, the ACGS updates the confidence level of the intent, for example, to "LOW" in the data 805 of the text message. The ACGS then compares the text string with attributes or regular expressions defined in the intent definitions stored in the database. If the token of the text string matches with the intent token and the intent token has at least one attribute that is a confidence contributor, the ACGS increases the confidence level of the corresponding intent, for example, to "MEDIUM" in the data 805 of the text message. If the current package is in the booster package of the ACGS, the ACGS increases the confidence level of the corresponding intent, for example, to "HIGH" in the data 805 of the text message.

FIG. 9 illustrates a flowchart of a method for generating actionable content based on the intent determined as shown in FIG. 8 using campaign data, according to an embodiment of the present invention. After determining the intent, the actionable content generation system (ACGS) generates actionable content based on the determined intent using the campaign data stored in the database. The database schema 401 comprising the campaign data is illustrated in FIG. 4 and FIG. 9. The ACGS determines 901 the campaign by comparing 902 the intent type and confidence level with the campaign data stored in the database as disclosed in the detailed description of FIGS. 6-7. The ACGS identifies 903 one or more actions to be performed from the determined campaign and generates actionable content 904. As illustrated in FIG. 9, the actionable content 904 comprises, for example, a suggestion drawer with a birthday sticker that is rendered by an element, for example, a prompt, on a graphical user interface (GUI) 801c or an input interface 801a on the user device 801. The ACGS compares 905 the identified action with available actions and facilitates performance of the action. The ACGS renders the element containing the actionable content, for example, a prompt 906, on the input interface 801a invoked on the user device 801 as illustrated in FIG. 9. When a user clicks on the prompt 906, the ACGS displays 907 the suggestion drawer 908 with the birthday sticker on the GUI 801c. The user may then click on the birthday sticker to send the birthday sticker to the other user to whom the text message "Happy Birthday" was sent. In an embodiment, the ACGS executes actions as soon as intent is determined. In another embodiment, the ACGS executes actions in a time period after determination of the intent. In another embodiment, the ACGS determines the intent for performing an action such as logging into an application for user profiling.

In one embodiment, ACGS receives the input text and identify the intent that matches with the input text. For Example, in a used case scenario, the intent is referred as IntentA. The ACGS fetches a list of all campaigns that have same intent type same as IntentA and a confidence attribute that is above IntentA's confidence level, wherein the list is referred to as a CampaignListA. Further, ACGS filters the campaigns in CampaignListA which can be shown on the user interface, wherein the filtered list is referred as CampaignListB. Furthermore, ACGS filters the campaigns in CampaignListB which can be displayed as per the cooling interval, wherein the second filtered list is referred as CampaignListC. As per the distribution weights of all campaigns in CampaignListC, ACGS decides the campaign which can be displayed on the user interface. For example, consider three 3 campaigns in CampaignListC namely, Campaign1, Campaign2 and Campaign3 and the corresponding the distribution weights are C1, C2 and C3. The calculation to identify the campaign for the text message includes three buckets, Bucket 1: 0 to C1.
Bucket 2: C1 to (C1+C2).
Bucket 3: (C1±C2) to (C1+C2+C3).

A random number in between 0 and (C1+C2+C3) is picked and depending upon the bucket it falls into, the campaign may be decided. The decided campaign is referred as FinalCampaign. In one embodiment, the icon URL and text for the FinalCampaign is shown on the emoji row.

In one embodiment, the actionable content is not limited, but also includes prompts, dialogs for stickers and the drawer programmatically designed to open without a prompt. In one embodiment, the prompts can be replaced with alert dialogs or notifications, wherein the prompts, alert dialogs and notifications are collectively called as "Actions". The actions may be executed immediately and/or delayed by a specific time interval. The actionable content further includes stickers, gifs, and branding etc.

Figure 10A:
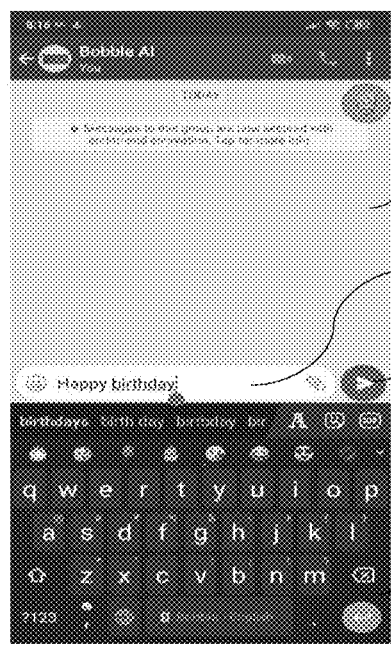
FIGS. 10A-10D illustrate a graphical user interface displayed on a user device, showing rendering of intent-based actionable content via an input interface invoked on the user device, in real time, according to an embodiment of the present invention.
Figure 10B:
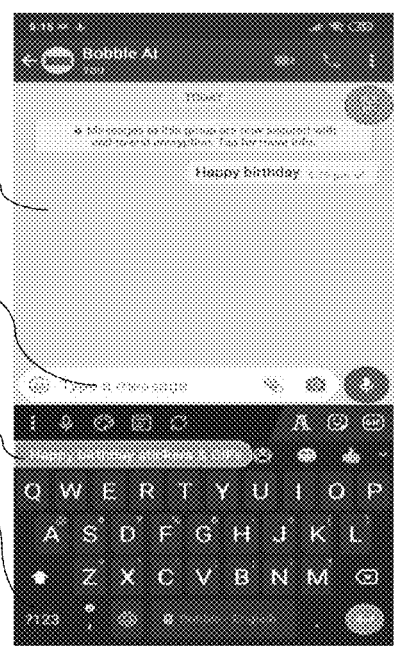
Figures 10C, 10D:
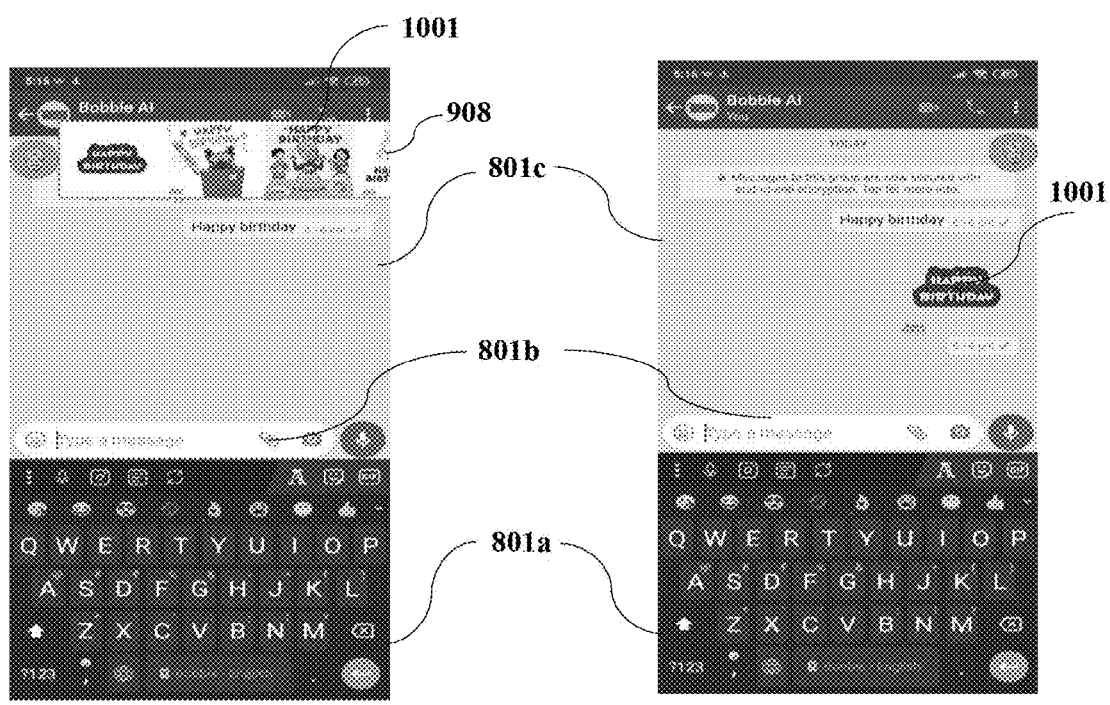

FIGS. 10A-10D exemplarily illustrate a graphical user interface (GUI) 801c displayed on a user device, showing rendering of intent-based actionable content via an input interface 801a, for example, a virtual keyboard, invoked on the user device, in real time, according to an embodiment of the present invention. Consider an example where a user types a text message "Happy Birthday" in an input field 801b of a user application such as a chat application deployed on a user device using the input interface 801a and clicks a send button 801d provided by the user application as illustrated in FIG. 10A. The user application sends the text message "Happy Birthday" to a chat window in the GUI 801c as illustrated in FIG. 10B. While the user types the text message in the input field 801b, the actionable content generation system (ACGS) receives the text message, determines intent with a confidence element, generates intent-based actionable content, and renders an element containing the intent-based actionable content on the GUI 801c as disclosed in the detailed description of FIGS. 5-9. For example, the ACGS renders an intent-based prompt 906 containing a suggestion drawer 908 with birthday stickers, for example, on an emoji row, of the input interface 801a as illustrated in FIG. 10B. When a user clicks on the intent-based prompt 906, the ACGS programmatically renders the suggestion drawer 908 with the birthday stickers on the GUI 801c as illustrated in FIG. 10C. The user may then select a birthday sticker 1001 from the suggestion drawer 908 and click on the birthday sticker 1001 to send the birthday sticker 1001 to the other user to whom the text message "Happy Birthday" was sent as illustrated in FIG. 10D.

Figure 11:
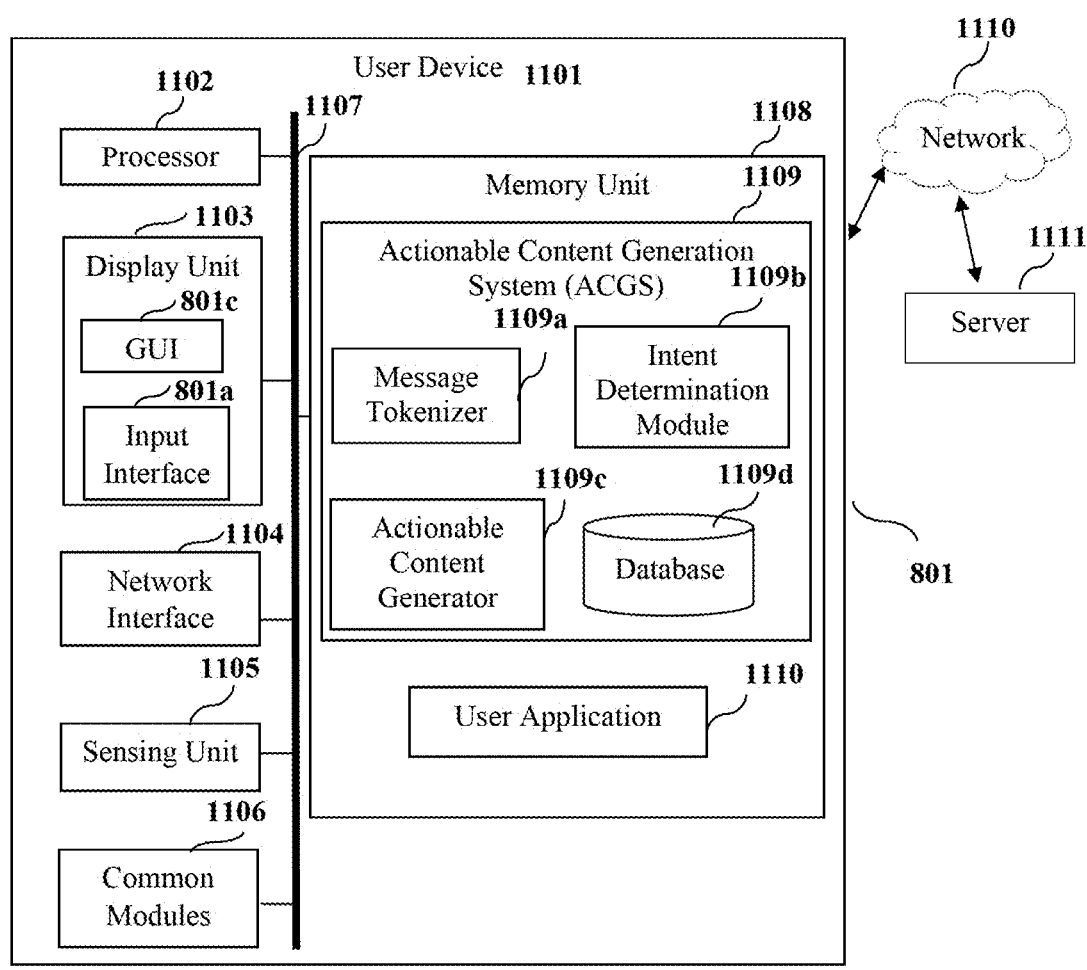
FIG. 11 illustrates an architectural block diagram of the system for generating and rendering intent-based actionable content via an input interface invoked on a user device, in real time, according to an embodiment of the present invention.

FIG. 11 illustrates an architectural block diagram of an exemplary implementation of the system 1100 for generating and rendering intent-based actionable content via an input interface 801a invoked on a user device 801, in real time, according to an embodiment of the present invention. In an embodiment, the system 1100 disclosed herein comprises the actionable content generation system (ACGS) 1109 integrated in the input interface 801a invokable on a user device 801, for example, a smartphone, a tablet computing device, etc., as illustrated in FIG. 11. In an embodiment, the ACGS 1109 is implemented using programmed and purposeful hardware of the user device 801. In another embodiment, the ACGS 1109 is added to a separate application and used irrespective of the application.

In an embodiment, the ACGS 1109 is accessible to users, for example, through a broad spectrum of technologies and user devices such as smart phones, tablet computing devices, endpoint devices, etc., with access to a network 1101, for example, a short-range network or a long-range network. The network 1101 is, for example, one of the internet, an intranet, a wired network, a wireless network, a network that implements Wi-Fi® of Wi-Fi Alliance Corporation, a mobile telecommunication network, etc., or a network formed from any combination of these networks. The ACGS 1109 is in operable communication with a server 1111 via the network 1101. The mappings of tokens to intent definitions and campaign data are server-configurable and editable from the server 1111 itself. In an embodiment, the campaigns and their actions that constitute the campaign data are added and deleted from the server 1111. The server 111 also stores mappings of tokens and intent definitions. The ACGS 1109 retrieves the mappings and the campaign data from the server 1111 via the network 1101. The ACGS 1109 stores the retrieved mappings and the campaign data in a database 1109d. The modules, for example, 1109a, 1109b, and 1109c fetch the mappings and the campaign data from the database 1109d using a data access object (DAO) which is static in nature. The ACGS 1109 creates a repository to access the mappings and the campaign data from the database 1109d with an abstract interface, which allows convenient and persistent querying of data.

As illustrated in FIG. 11, the user device 801 comprises at least one processor 1102 and a non-transitory, computer-readable storage medium, for example, a memory unit 1108, for storing computer program instructions defined by the modules, for example, 1109a, 1109b, and 1109c of the ACGS 1109. In an embodiment, the modules, for example, 1109a, 1109b, 1109c, and 1109d of the ACGS 1109 and the user application 1110 are stored in the memory unit 1108 as illustrated in FIG. 11. The user application 1110 is, for example, a messaging application, a business communication application, an electronic commerce (e-commerce) application, an email application, a gaming application, a media application, etc., deployed on the user device 801.

The processor 1102 is operably and communicatively coupled to the memory unit 1108 for executing the computer program instructions defined by the modules, for example, 1109a, 1109b, and 1109c of the ACGS 1109. The processor 1102 refers to any one or more microprocessors, central processing unit (CPU) devices, finite state machines, computers, microcontrollers, digital signal processors, logic, a logic device, an application specific integrated circuit (ASIC), a field-programmable gate array (FPGA), a chip, etc., or any combination thereof, capable of executing computer programs or a series of commands, instructions, or state transitions. The ACGS 1109 is not limited to employing the processor 1102. In an embodiment, the ACGS 1109 employs one or more controllers or microcontrollers.

As illustrated in FIG. 11, the user device 801 further comprises a data bus 1107, a display unit 1103, a network interface 1104, a sensing unit 1105, and common modules 1106. The data bus 1107 permits communications between the modules, for example, 1102, 1103, 1104, 1105, 1106, and 1108. The display unit 1103, via a graphical user interface (GUI) 801c, displays information, display interfaces, media content, user interface elements such as checkboxes, input text fields, etc., for example, for allowing a user to invoke and execute the ACGS 1109, input data and perform input actions for sending messages via the user application 1110 and executing recommended actions contained in the intent-based actionable content generated by the ACGS 1109.

The network interface 1104 enables connection of the ACGS 1109 to the network 1101. The network interface 1104 is, for example, one or more of infrared interfaces, interfaces implementing Wi-Fi' of Wi-Fi Alliance Corporation, universal serial bus interfaces, FireWire® interfaces of Apple Inc., interfaces based on transmission control protocol/internet protocol, interfaces based on wireless communications technology such as satellite technology, radio frequency technology, near field communication, etc. The sensing unit 1105 comprises one or more sensors operably coupled to the processor 1102 of the user device 801. The sensors comprise, for example, tactile sensors, image sensors, motion sensors, gesture sensors, etc., and other sensors configured to receive inputs of different types from a user. The common modules 1106 of the user device 801 comprise, for example, input/output (I/O) controllers, input devices, output devices, fixed media drives such as hard drives, removable media drives for receiving removable media, etc. Computer applications and programs are used for operating the ACGS 1109. The programs are loaded onto fixed media drives and into the memory unit 1108 via the removable media drives. In an embodiment, the computer applications and programs are loaded into the memory unit 1108 directly via the network 1101.

In an embodiment, the ACGS 1109 comprises modules defining computer program instructions, which when executed by the processor 1102, cause the processor 1102 to generate and render intent-based actionable content via the input interface 801a in real time. In an embodiment, the modules of the ACGS 1109 comprise a message tokenizer 1109a, an intent determination module 1109b, an actionable content generator 1109c, and the database 1109d. The database 1109d stores the mappings and the campaign data as disclosed above. The intent determination module 1109b and the actionable content generator 1109c retrieve the mappings and the campaign data from the database 1109d for intent determination and actionable content generation, respectively.

As a user enters one or more messages in the input field of the user application 1110 using the input interface 801a, the message tokenizer 1109a, independent of the user application 1110, detects and simultaneously analyzes the message(s) being entered by the user in the input field in real time. The message tokenizer 1109a is configured to generate tokens from the message(s) in real time while the user enters the message(s) in the input field using the input interface 801a. The intent determination module 1109b is configured to determine intent with a confidence element from the generated tokens in real time based on a mapping stored in the database 1109d and a confidence computation as disclosed in the detailed description of FIGS. 5-6 and FIG. 8. In an embodiment, the intent determination module 1109b employs a rule-based system for determining intent of a message in real time while a user enters the message in the input field of the user application 1110 using the input interface 801a. In another embodiment, the intent determination module 1109b determines the intent based on a context of the message(s) using artificial intelligence.

The actionable content generator 1109c generates actionable content based on the determined intent using the campaign data stored in the database 1109d as disclosed in the detailed description of FIGS. 6-7 and FIG. 9. The campaign data comprises, for example, definitions of intent and ongoing campaigns. The actionable content generator 1109c renders at least one element, for example, one or more of prompts, links, dialogs, notifications, etc., containing the generated actionable content on the GUI 801c or the input interface 801a for interaction by the user and performance of one or more of multiple recommended actions contained in the generated actionable content.

The message tokenizer 1109a, the intent determination module 1109b, and the actionable content generator 1109c are disclosed above as software executed by the processor 1102. In an embodiment, the modules, for example, 1109a, 1109b, and 1109c of the ACGS 1109 are implemented completely in hardware. In another embodiment, the modules, for example, 1109a, 1109b, and 1109c of the ACGS 1109 are implemented by logic circuits to carry out their respective functions disclosed above. In another embodiment, the ACGS 1109 is also implemented as a combination of hardware and software including one or more processors, for example, 1102, that are used to implement the modules, for example, 1109a, 1109b, and 1109c of the ACGS 1109. The processor 1102 retrieves instructions defined by the message tokenizer 1109a, the intent determination module 1109b, and the actionable content generator 1109c from the memory unit 1108 for performing respective functions disclosed above. The non-transitory, computer-readable storage medium disclosed herein stores computer program instructions executable by the processor 1102 for generating and rendering intent-based actionable content via the input interface 801a in real time.

The present invention detects intent in real time while a user types a message in the input field of the user application using a rule-based system. Moreover, the present invention implements context-based intent detection using artificial intelligence. Furthermore, the present invention renders or presents an intent-based action to the user in the input interface itself. The present invention is used for suggesting enhanced actionable content comprising, for example, stickers, GIF images, links to websites or applications (apps), etc., during an ongoing conversation between users through the user application. The present invention also renders prompts with brand-specific material, information related to promotional campaigns, and content with links to associated websites, apps, and stores based on the intent of a user's messages. The present invention has applications in textual and visual communication mediums such as chatting applications, virtual text input mediums such as virtual keyboards, social networking applications, etc. The present invention renders intent-based prompts and various other actionable components, for example, dialogs for stickers, alert dialogs, notifications, directly accessible drawers, etc.

According to an embodiment of the present invention, intent determination is independent of a recipient of a message sent by an originating user and the actionable content is generated based only on the originating user's messages. That is, there is no dependency on the user application(s) or the messages sent by the recipient. The ACGS performs intent determination on the input interface and analyzes messages sent by the originating user through the user application. In an embodiment, the ACGS determines the intent from the last sentence of a message sent by the originating user, thereby rendering actionable content through an element, for example, a prompt, comprising content such as stickers related to the last sentence.

In an embodiment, the present invention facilitates generation and rendering of intent-based actionable content from a single side or the client side, that is, the originating user's side as there is no dependency on the user application(s) or the messages sent by the recipient. Moreover, the present invention facilitates generation and rendering of intent-based actionable content in real time while the user is typing messages using the input interface. In an embodiment, the intent determined by the ACGS is used for predicting digital pictorial images, for example, emojis, that may be displayed on a row or a bar of the input interface. In this embodiment, the ACGS determines the context of the originating user's message and updates the bar of digital pictorial images displayed on the input interface with corresponding emojis. In the client-side operation of the present invention, no user related data leaves the user device and is not required for executing the operations of the present invention while the user types a message into an input field of a user application. In an embodiment, the present invention is implemented on the server side, where some embodiments are dependent on the server or the network.

The foregoing examples and illustrative implementations of various embodiments have been provided merely for explanation and are in no way to be construed as limiting of the present invention. While the present invention has been described with reference to various embodiments, illustrative implementations, drawings, and techniques, it is understood that the words, which have been used herein, are words of description and illustration, rather than words of limitation. Further, although the present invention has been described herein with reference to particular means, materials, embodiments, techniques, and implementations, the present invention is not intended to be limited to the particulars disclosed herein; rather, the present invention extends to all functionally equivalent structures, methods and uses, such as are within the scope of the appended claims. It will be understood by those skilled in the art, having the benefit of the teachings of this specification, that the present invention is capable of modifications and other embodiments may be effected and changes may be made thereto, without departing from the scope and spirit of the present invention.

What is claimed is:

1. A system for generating and rendering intent-based actionable content, the system comprising:
an electronic device comprising an input device, at least one hardware processor, a memory unit operably and communicatively coupled to the at least one hardware processor, and a display unit: and
an actionable content generation unit operably coupled to the at least one hardware processor and an input interface on the electronic device, wherein the actionable content generation unit is run and executed on the at least one hardware processor and configured to:
analyze an input message received from the input interface into plurality of words;
generate a plurality of tokens of the input message based on the plurality of words:
generate a static model comprising a criteria for mapping tokens, intent definitions, and a list of campaigns for one or more data access objects:
map the generated plurality of tokens of the input message with a plurality of intent definitions of a static model to identify an intent of the input message:
calculate a confidence level for the input message based on the mapped intent definitions of the plurality of tokens, and wherein the confidence level is any one of a no confidence level, a low confidence level, a medium confidence level, and a high confidence level; and
identity and assign at least one campaign to the input message based on the identified intent and the calculated confidence level;
wherein the at least one campaign is retrieved from a campaign data, and wherein the campaign data comprises definitions of intent and ongoing campaigns:
wherein the actionable content generation unit is run on the at least one hardware processor to generate, render, and invoke an intent-based actionable content on a user device in real time through an input interface, and wherein the actionable content generation is invoked within the input interface on the user device, independent of a user application, wherein the user application is a messaging application or chat application or e-mail application, and wherein the intent of a message is determined on real time using an artificial intelligence, and wherein each of the plurality of tokens is further assigned with an intent contributor and a confidence contributor, and wherein the actionable content generation unit creates a static model class for retrieval of the campaign data and wherein the actionable content generation unit creates the static model class for storing token mappings, intent definitions, and a list of campaigns from one or more data access objects, and wherein the actionable content generation unit executes the static model class on a separate thread for capturing an input operation of the keyboard, comparison, and determination of intent of each sentence of a message entered into the input field by a user, and wherein the actionable content generation unit employs a rule-based system for determining the intent of a message in real time while the user enters the message in an input field of the user application using the input interface invoked on the user device, and wherein the rule-based system includes a system of regular expressions (regex) used for comparing and determining an intent type and an intent name, and wherein the set of regular expressions is provided for intent detection and intent attribute extraction, and wherein mappings of tokens with intent definitions are stored in a definition file, and wherein the definition file contains a set of regular expressions, and a list of operating system application package names, and wherein the list of operating system application package names increases or boosts the confidence level by one level of the determined intent, and wherein the actionable content generation unit generates actionable content based on the determined intent using the campaign data, and wherein the campaign data comprises definitions of intent and ongoing campaigns, and wherein each campaign contains attributes to control how the campaign is rendered or displayed to the user, an action to be taken in response the user's click action, the set of applications in which the campaign is displayed, the set of intent type and intent attributes for which the campaign is displayed, a demographic target comprising age, gender, location of the campaign, prompt, text within prompt, and link to web site, and wherein the campaign further includes a cooling interval that provides a time difference between campaigns that are shown consecutively, the estimated confidence level when intents have confidence level above a threshold level, a display interval that provides a time interval for which the campaign is shown at one point of time, a distribution weight which decides weightage of the campaign, and wherein the intent lists direct application and booster application associated with the intent, and wherein at least a processor is configured to execute a snippet for generating the actionable content based on the determined intent using the campaign data.

2. The system as claimed in claim 1, wherein the actionable content generation unit is run and executed on the at least one hardware processor and configured to generate at least one actionable content based on the matched at least one campaign.

3. The system as claimed in claim 2, wherein the actionable content generation unit is run and executed on the at least one hardware processor and configured to render at least one element containing the generated actionable content on the input interface.

4. The system as claimed in claim 1, wherein the intent contributor is used for assigning an intent with the token, and wherein the confidence contributor is used for assigning a confidence level with the token.

5. The system as claimed in claim 1, wherein the high confidence level is detected based on the intent contributor and the confidence contributor assigned with the token.

6. The system as claimed in claim 1, wherein the medium confidence level is detected based on at least any one of the intent contributors, and a non-confidence contributor assigned with the token.

7. The system as claimed in claim 1, wherein the low confidence level is detected based on at least any one of the intent contributors, the confidence contributor, a non-confidence contributor assigned with the token.

8. The system as claimed in claim 1, wherein the actionable content generation unit is run and executed on the at least one hardware processor and configured to set the no confidence level as a default confidence level.

9. The system as claimed in claim 1, wherein the confidence level is determined using at least any one of a direct application or a booster application.

10. A method for generating and rendering intent-based actionable content, the method comprising steps of:
analyzing an input message received from an input interface of an input device by running and executing an actionable content generation unit on at least one hardware processor;
generating a plurality of tokens of the input message into plurality of words by running and executing the actionable content generation unit on the at least one hardware processor;
generating a static model comprising a criteria for mapping tokens, intent definitions, and a list of campaigns for one or more data access objects;
mapping each of plurality of tokens of the input message with intent definitions of a static model to identify intent of the input message by running and executing the actionable content generation unit on the at least one hardware processor;
calculating a confidence level of the input message based on the mapped intent definitions of the plurality of tokens by running and executing the actionable content generation unit on the at least one hardware processor and, and wherein the calculated confidence level is at least any one of a no confidence level, a low confidence level, a medium confidence level, and a high confidence level; and identifying and assigning at least one campaign to the input message based on the identified intent and the calculated confidence level by running and executing the actionable content generation unit on the at least one hardware processor;
wherein the actionable content generation unit is nm on the at least one hardware processor to generate, renders, and invoke an intent-based actionable content on a user device, in real time through an input interface, and wherein the actionable content generation is invoked within the input interface on the user device, independent of a user application, wherein the user application is a messaging application or chat application or e-mail application, and wherein the intent of a message is determined on real time using an artificial intelligence, and wherein the actionable content generation unit executes a static model class on a separate thread for capturing an input operation of the keyboard, comparison, and determination of intent of each sentence of a message entered into the input field by a user, and wherein the actionable content generation unit employs a rule-based system for determining the intent of a message in real time while the user enters the message in an input field of the user application using the input interface invoked on the user device, and wherein the rule-based system includes a system of regular expressions (regex) used for comparing and determining an intent type and an intent name, and wherein each of the tokens is further assigned with an intent contributor and a confidence contributor, and wherein the set of regular expressions is provided for intent detection and intent attribute extraction, and wherein mappings of tokens with intent definitions are stored in a definition file, and wherein the definition file contains a set of regular expressions, and a list of operating system application package names, and wherein the list of operating system application package names increases or boosts the confidence level by one level of the determined intent, and wherein the actionable content generation unit generates actionable content based on the determined intent using the campaign data, and wherein the campaign data comprises definitions of intent and ongoing campaigns, and wherein each campaign contains attributes to control how the campaign is rendered or displayed to the user, an action to be taken in response the user's click action, the set of applications in which the campaign is displayed, the set of intent type and intent attributes for which the campaign is displayed, a demographic target comprising age, gender, location of the campaign, prompt, text within prompt, and link to web site, and wherein the campaign further includes a cooling interval that provides a time difference between campaigns that are shown consecutively, the estimated confidence level when intents have confidence level above a threshold level, a display interval that provides a time interval for which the campaign is shown at one point of time, a distribution weight which decides weightage of the campaign, and wherein the intent lists direct application and booster application associated with the intent, and wherein at least a processor is configured to execute a snippet for generating the actionable content based on the determined intent using the campaign data.

11. The method as claimed in claim 10 further comprises generating at least one actionable content based on the matched campaign.

12. The method as claimed in claim 11 further comprises rendering at least one element containing generated actionable content on the input interface.

13. The method as claimed in claim 10, wherein the intent contributor is used for assigning an intent with the token, and wherein the confidence contributor is used for assigning a confidence level with the token.

14. The method as claimed in claim 10, wherein the high confidence level is detected based on the intent contributor and the confidence contributor assigned with the token.

15. The method as claimed in claim 10, wherein the medium confidence level is detected based on at least any one of the intent contributors, and a non-confidence contributor assigned with the token.

16. The method as claimed in claim 10, wherein the low confidence level is detected based on at least any one of the intent contributors, the confidence contributor, a non-confidence contributor assigned with the token.

17. The method as claimed in claim 10, wherein the actionable content generation unit is further run and executed on the at least one hardware processor and configured to set the no confidence level as a default confidence level.

18. The method as claimed in claim 10, wherein the confidence level is determined using at least any one of a direct application or a booster application.

\* \* \* \* \*